United States Patent
Toudji (10) Patent No.: US 10,936,609 B2
(45) Date of Patent: Mar. 2, 2021

(54) PRESENTING USER INFORMATION SUGGESTIONS

(71) Applicant: Apple Inc., Cupertino, CA (US)

(72) Inventor: Sofiane Toudji, San Francisco, CA (US)

(73) Assignee: Apple Inc., Cupertino, CA (US)

(*) Notice: Subject to any disclaimer, the term of this patent is extended or adjusted under 35 U.S.C. 154(b) by 319 days.

(21) Appl. No.: 15/983,624

(22) Filed: May 18, 2018

(65) Prior Publication Data

US 2019/0354625 A1    Nov. 21, 2019

(51) Int. Cl.
| | |
|---|---|
| G06F 16/248 | (2019.01) |
| G06F 16/2457 | (2019.01) |
| G06F 3/0482 | (2013.01) |
| G06F 40/174 | (2020.01) |

(52) U.S. Cl.
CPC ...... *G06F 16/248* (2019.01); *G06F 16/24578* (2019.01); *G06F 3/0482* (2013.01); *G06F 40/174* (2020.01)

(58) Field of Classification Search
CPC .............. G06F 16/248; G06F 16/24578; G06F 40/174; G06F 3/0482
USPC ........................................................ 707/733
See application file for complete search history.

(56) References Cited

U.S. PATENT DOCUMENTS

| | | | | |
|---|---|---|---|---|
| 7,685,144 | B1* | 3/2010 | Katragadda | G06F 40/274 |
| | | | | 707/999.101 |
| 9,842,144 | B2* | 12/2017 | Cort | G06F 3/048 |
| 10,635,748 | B2* | 4/2020 | Liu | G06F 40/274 |
| 2017/0322920 | A1* | 11/2017 | Meschkat | G06F 40/279 |
| 2017/0357627 | A1* | 12/2017 | Peterson | G06F 40/174 |
| 2018/0260085 | A1* | 9/2018 | Whitelaw | G06F 40/174 |
| 2018/0260086 | A1* | 9/2018 | Leme | G06F 3/0484 |

* cited by examiner

*Primary Examiner* — Robert W Beausoliel, Jr.
*Assistant Examiner* — Arthur Ganger
(74) *Attorney, Agent, or Firm* — Invoke (57) ABSTRACT

In some implementations, a computing device can generate and present suggestions for filling in various data input fields presented by a graphical user interface of a host application running on the computing device. For example, when a user selects a data input field presented by the graphical user interface, the host application can cause an operating system (OS) process external to the host application on the computing device to search various hardware, software, configuration, communication, and/or event sources to obtain user information associated with the user and relevant to the input field type identifier. The user information can be presented by the OS process as suggestions on the graphical user interface without providing the user information to the host application. When the user selects a presented suggestion, the OS process can provide the user selected suggestion to the host application as input to the user selected data input field.

20 Claims, 7 Drawing Sheets

PRESENTING USER INFORMATION SUGGESTIONS

TECHNICAL FIELD

The disclosure generally relates to generating suggestions for data input.

BACKGROUND

Users are presented with a multitude of graphical user interface (GUI) forms. For example, whenever a user uses a computing device to create a new account with an online service, a software application, or to purchase goods or services online, the user is typically required to type text into an GUI form to provide user information, such as the user's name, address, phone number, email address, and/or other user information. Typing this user information into various data input fields can be a tedious task.

SUMMARY

In some implementations, a computing device can generate and present suggestions for filling in various data input fields presented by a graphical user interface of a host application running on the computing device. For example, when a user selects a data input field presented by the graphical user interface, the host application can cause an operating system (OS) process external to the host application on the computing device to search various hardware, software, configuration, communication, and/or event sources to obtain user information associated with the user and relevant to the input field type identifier. The user information can be presented by the OS process as suggestions on the graphical user interface without providing the user information to the host application. When the user selects a presented suggestion, the OS process can provide the user selected suggestion to the host application as input to the user selected data input field.

Particular implementations provide at least the following advantages. The amount of time that the user spends filing out graphical user interface (GUI) forms can be reduced by presenting user information suggestions and allowing the user to select user information suggestions to provide as input to various form input fields. The amount input that the user is required to provide when filing out GUI forms can be reduced by presenting user information suggestions and allowing the user to select user information suggestions to provide as input to various form input fields. For example, instead of requiring the user to provide a multitude of keystrokes to type in each character of user information required by an GUI form data field, the user can simply provide a single input selecting a suggestion in order to provide the input required by an GUI form data field. The user's user information can be collected and presented on the GUI without providing the user information to the host application until a user provides input indicating that the user wishes to share the user information, or a selected portion of user information, with the host software application.

Details of one or more implementations are set forth in the accompanying drawings and the description below. Other features, aspects, and potential advantages will be apparent from the description and drawings, and from the claims.

DESCRIPTION OF DRAWINGS

Lie reference symbols in the various drawings indicate like elements.

DETAILED DESCRIPTION

Figure 1:
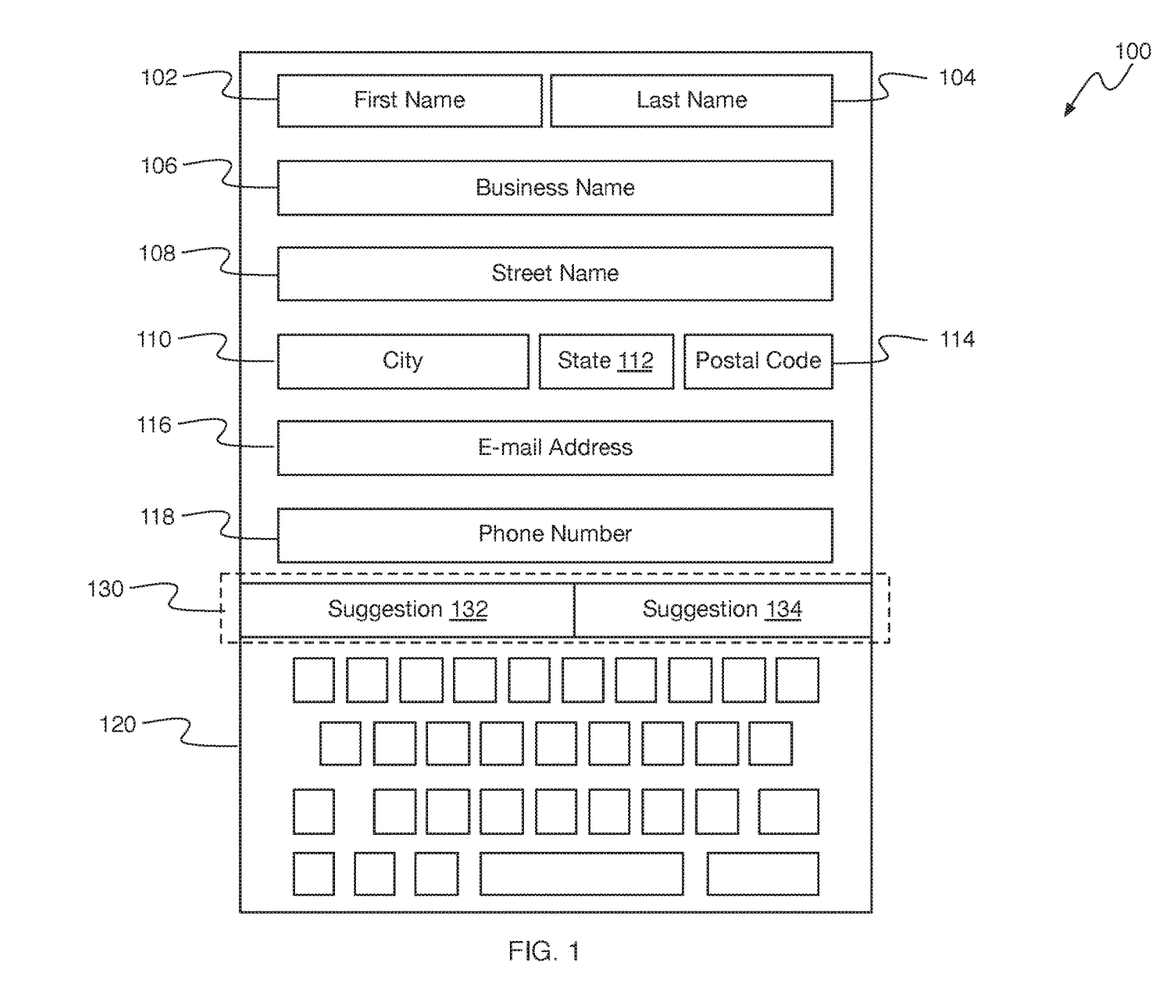
FIG. 1 is an illustration of an example graphical user interface for presenting user information suggestions.

FIG. 1 is an illustration of an example graphical user interface 100 for presenting user information suggestions. For example, GUI 100 can be presented by a host software application (e.g., host application) running on a computing device. For example, the host application can be a web browser, special purpose software application, third party software application created by an entity that is different than the entity that created the computing device and/or operating system of the computing device.

In some implementations, the host application can present GUI 100, or similar GUI, to obtain the user's information. GUI 100 presents an example data input form for collecting user information from a user of the computing device. For example, the user may be required to create a user account before the user is allowed access to various features of the host application. GUI 100 can be presented by the host application to collect the necessary user information for creating the user account. When making a purchase through the host application, the user may be required by the host application to provide user information (e.g., name, address, phone number, etc.) in order to complete the purchase. GUI 100 can be presented by the host application to collect the user's user information necessary for completing the purchase transaction.

In some implementations, GUI 100 can include various data input fields. For example, the data input fields can include text input fields, pull-down menus, scrolling menus, or similar data input fields. The data input fields can be configured to request and/or accept various types of user information. For example, data input fields 102 and 104 can be configured to accept user input specifying the user's first and last name, respectively. Data input field 106 can be configured to accept user input specifying the user's business name. Data input fields 108, 110, 112, and 114 can be configured to accept user input specifying the street name, city, state, and postal code of the user's residence or business address. Data input field 116 can be configured to accept user input specifying the user's email address. Data input field 118 can be configured to accept user input specifying the user's phone number.

When a user selects one of the data input fields presented on GUI 100, the host application can cause virtual keyboard 120 to be presented on GUI 100. For example, keyboard 120 can be generated and/or presented by a process (e.g., operating system, other process, etc.) external to the host application. When the user selects data field 102 for providing input specifying the user's first name, the host application can cause virtual keyboard 120 to be presented so the user can provide character input specifying the user's first name using virtual keyboard 120. The user can provide input to keyboard 120 specifying each character of the user's first name and keyboard 120 can provide the character input to the host application as input to data input field 102. The user can then select another data input field presented on GUI 100 and provide character input to the selected data input field through keyboard 120.

As illustrated in the example GUI 100, the user may be required to input 50, 70, 100 or more characters to complete the form presented by GUI 100. To reduce the amount of input required of a user, keyboard 120 can be presented with suggestions bar 130, including suggestion 132 and/or suggestion 134. Suggestions 132 and 134 can include user information collected by or known to the operating system of the computing device and relevant to the currently selected data input field presented on GUI 100. When the user selects a suggestion (e.g., suggestion 132) presented by suggestion bar 130, the external keyboard and suggestion bar (KSB) process can send the user selected suggestion to the host application as input to the currently selected data input field.

In some implementations, suggestion bar 130, and the suggestions presented by suggestion bar 130, can be generated, provided, and/or presented by a process external to the host application so that the user information obtained or presented by suggestion bar 130 is only shared with the host application when the user explicitly provides input indicating that the user wishes to share the user information with the host application. Thus, only when a user selects a suggestion (e.g., suggestion 132) from suggestion bar 130, will the KSB process send the user's information (e.g., the user-selected suggestion) to the host application as input to the selected data field.

Figure 2:
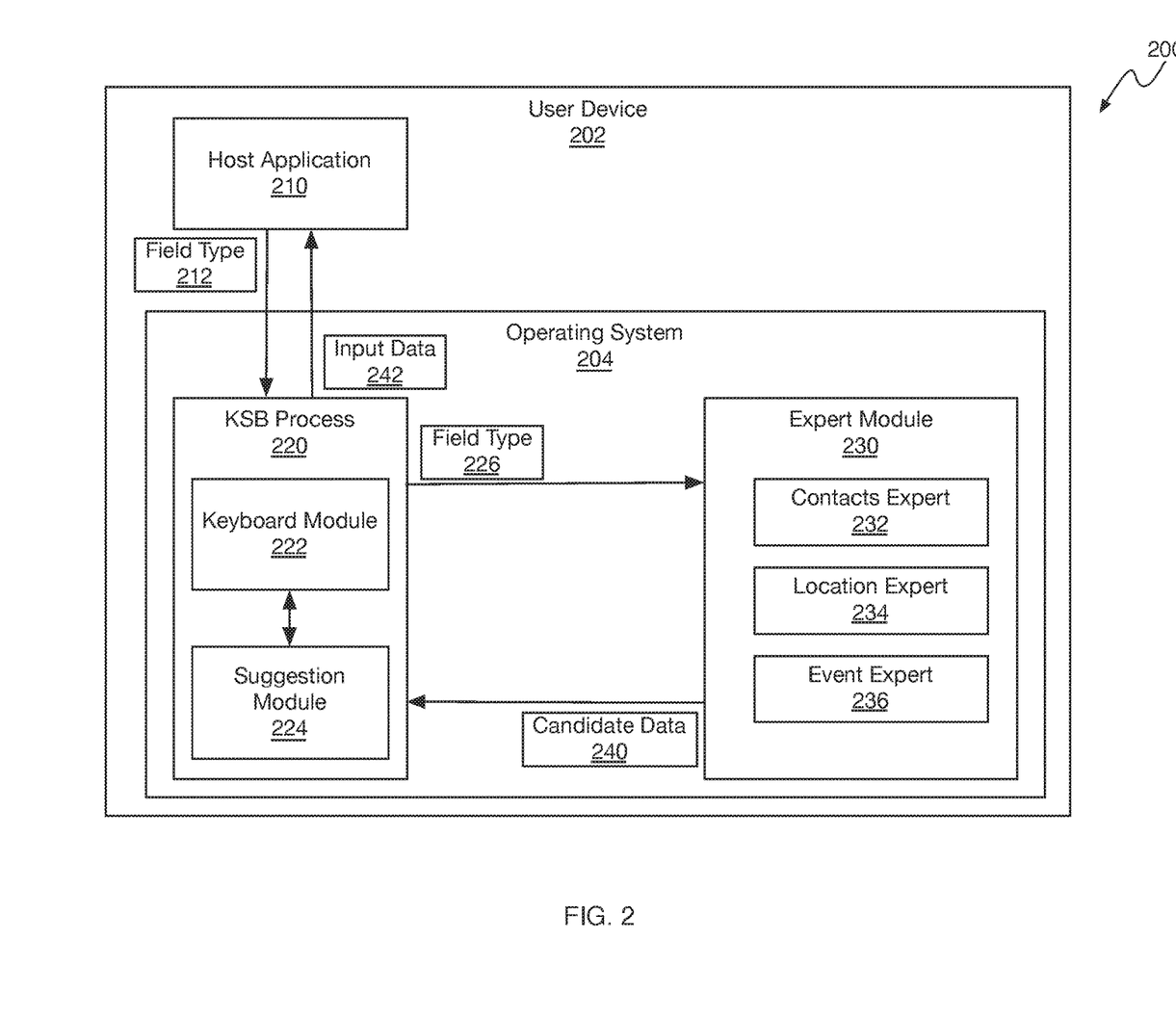
FIG. 2 is a block diagram of an example system for presenting user information suggestions.

FIG. 2 is a block diagram of an example system 200 for presenting user information suggestions. For example, in response to a user selecting a data input field of a form presented on user device 202, system 200 can search user device 202 for user information relevant to the type of data input field selected by the user, obtain the relevant user information, and present on a display of user device 202 suggestions as to which of the obtained user information might be most relevant to the selected data input field. System 200 can present the user information suggestions to the user without providing the user information to the host application. Only after receiving a user selection of a specific item of user information presented on the display of user device 202 will the selected specific item of user information be provided to the host application. For example, receiving the user's selection of the specific item of user information can be interpreted as the user authorizing user device 202 to share the specific item of user information with the host application.

In some implementations, the user information stored on user device 202 can be generated at or by user device 202. In some implementations, the user information stored on user device 202 can be user information synchronized to and/or from other user devices associated with the user. For example, the user may have multiple user devices (e.g., laptop computer, smartphone, tablet computer, smartwatch, etc.). The user may configure one of the user devices with user information (e.g., an email account, store account, subscription account, etc.). A user device may collect user information about the user by monitoring user behavior. In any case, user information configured and/or collected on one user device may be synchronized with other user devices (e.g., user device 202) associated with the same user. Thus, the user information stored on user device 202 and/or used to generate user information suggestions may be generated by user device 202 or some other device associated with the user of user device 202. Stated differently, the data sources described herein from which user information is obtained can include data from other user devices associated with the user.

In some implementations, system 200 can include user device 202. For example, user device 202 can be a computing device, such as a desktop computer, laptop computer, mobile device, tablet computer, smartphone, smartwatch, wearable device, or other computing device. User device 202 can be configured with an operation system 204 (e.g., application framework, software libraries, modules, drivers, software components, processes, etc.) that provides application programming interfaces (API), various software services, and/or built-in application features for applications (e.g., first party applications, third party applications, etc.) running on user device 202.

In some implementations, user device 202 can include host application 210. For example, host application 210 can be a software application installed on user device 202. Host application 210 can be a third-party application built by people and/or entities other than those who built user device 202 and/or the operating system 204. Host application 210 can be configured to present GUI 100, as described above with reference to FIG. 1.

To present keyboard 120 and/or suggestion bar 130 on GUI 100, host application 210 can be configured to interact with keyboard and suggestion bar (KSB) process 220. For example, KSB process 220 can be a component of operating system 204 on user device 202. KSB process 220 can be external to host application 210 but can be called by host application 210 to provide keyboard 120 and/or suggestion bar 130 in various graphical user interfaces of host application 210, such as in GUI 100 described above. For example, when a user selects a text input field of GUI 100, host application 210 can call or invoke KSB process 220 to cause KSB process 220 to present keyboard 120 and/or suggestion bar 130 on GUI 100.

In some implementations, KSB process 220 can include keyboard module 222 that is configured to generate and present keyboard 120. KSB process 220 can include suggestion module 224 that is configured to generate and present suggestion bar 130. Since KSB process 220 is external to host application 210, data, including the user's personal data, obtained, generated, and/or presented by KSB process 220 is provided to host application 210 through various inter-process API calls only when authorized by the user. Thus, the data within KSB process 220 is protected from unauthorized access by host application 210.

To generate suggestions for presentation on suggestion bar 130, host application 210 can send a message 212 to KSB process 220 when a data field of a form is selected by the user. For example, each data input field on GUI 100 can be configured with a field type identifier. When host application 210 sends message 212 to KSB process 220, host application 210 can include the field type identifier for the selected data input field in message 212. When KSB process 220 receives message 212 including the field type identifier for the user selected data input field, suggestion module 224 can send message 226 identifying the field type of the user selected data input field to expert module 230.

In some implementations, user device 202 can include expert module 230. For example, expert module 230 can be a software module, library, etc., loaded into KSB process 220. Expert module 230 can be a software process separate from KSB process 220 and/or host application 210. For example, expert module 230 can be a process or component of the operating system 204 of user device 202 that searches for, obtains, and/or provides relevant user information associated with the user to authorized clients of user device 202. For example, first party applications and processes (e.g., operating system 204, KSB process 220, expert module 230, etc.) may be authorized to access the user information provided by expert module 230 because expert module 230 is also a first party process, while other processes (e.g., third party applications) may not be given direct access to expert module 230 and/or the user information provided by expert module 230.

Expert module 230 can include experts that are configured to find, obtain, and provide certain types of information (e.g., user information) on user device 202. For example, expert module 230 can include contacts expert 232 for obtaining contact information from various sources on user device 202. Expert module 230 can include a location expert 234 for obtaining location information from various sources on user device 202. Expert module 230 can include an event expert 236 for obtaining event information from various sources on user device 202. Each of these experts are described in greater detail below.

Expert module 230 can provide the field type identifier received in message 226 from KSB process 220 to each expert in expert module 230. Each individual expert can determine if they are configured to provide information in response to receiving the field type identifier. For example, each expert can be configured to handle information gathering for a plurality of different field types. A particular field type may be handled by only one expert. A particular field type may be handled by multiple experts.

If an expert is configured to find and/or provide information for the field type identifier received by expert module 230 in message 226, the expert can search various hardware sources (e.g., SIM card), configuration sources (e.g., application settings, operating system settings, and/or device settings), event sources (e.g., calendar application and/or database), communication sources (e.g., email, instant messages, text messages, etc.), and/or application sources (e.g., application specific data) for user information relevant to the field type identifier. The expert can collect the relevant user information items (e.g., relevant to the field type identifier) found at the various data sources and generate suggestion candidate data for each item of user information collected and send the collected user information items to expert module 230.

In some implementations, the suggestion candidate data can include a label describing the user information item, a value that corresponds to the user information item, and a score for the user information item. For example, the label can be a representation (e.g., text) of the user information item. For example, the label can be presented in addition to or in lieu of the user information item on suggestion bar 130. For example, instead of presenting the address for a restaurant the user recently viewed or searched for, the name of the restaurant can be presented on suggestion bar 130 as the label or identifier for a location or address.

When expert module 230 receives the suggestion candidate data from each expert, expert module 230 can combine all of the suggestion candidate data received from the various experts into a single data collection 240 and send the collection of suggestion candidates to KSB process 220.

In some implementations, KSB process 220 can receive a collection of suggestion candidates (e.g., suggestion candidate data) from expert module 230. For example, suggestion module 224 can select one or more of the suggestion candidates from the collection of suggestion candidates to present as user information suggestions on suggestion bar 130. Suggestion module 224 can present the selected suggestions on suggestion bar 130 without providing the selected suggestions (e.g., user information) to host application 210.

Figure 3:
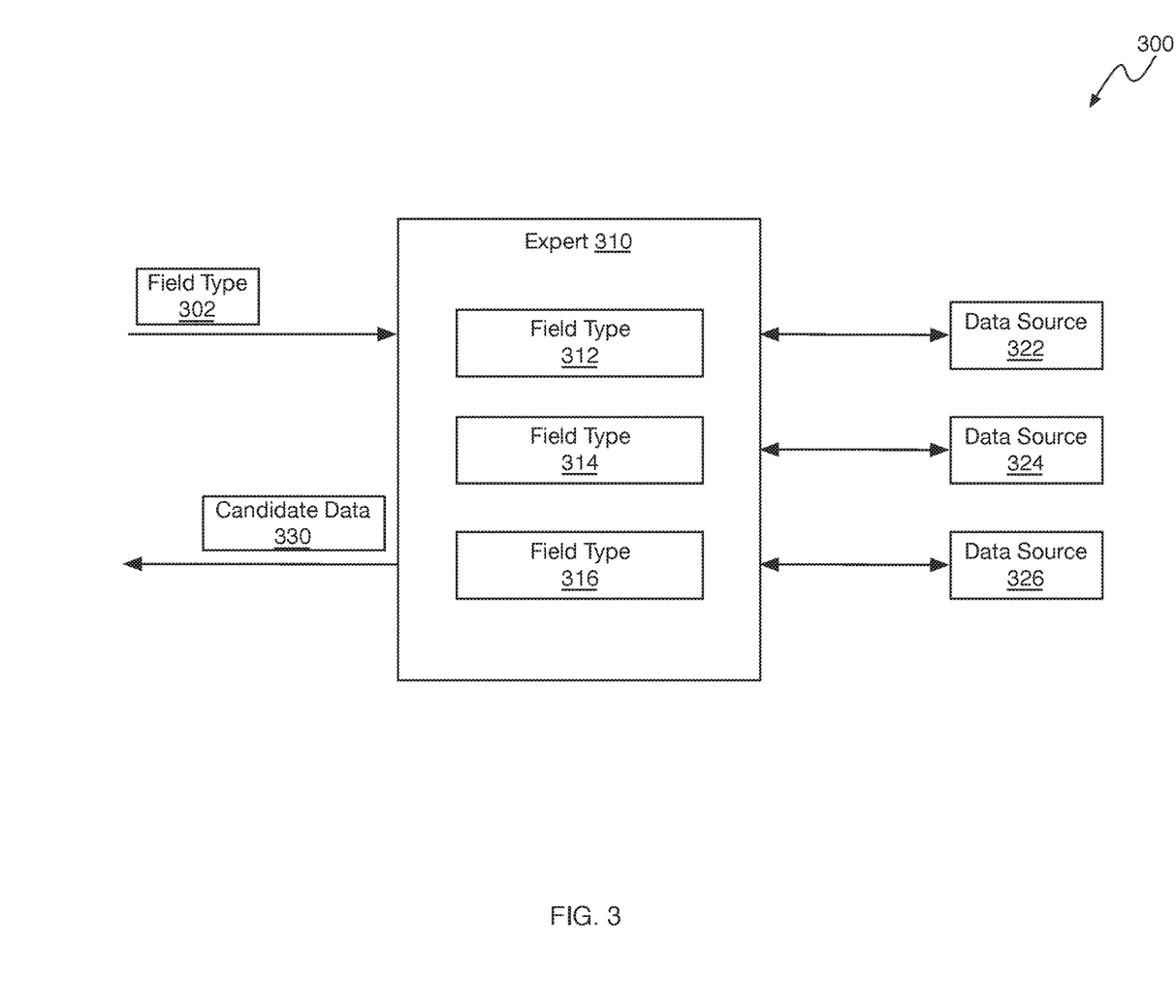
FIG. 3 is a block diagram of an example system for obtaining user information from various sources on a user device.

FIG. 3 is a block diagram of an example system 300 for obtaining user information from various sources on a user device. For example, system 300 can correspond to system 200 described above. As described above, system 300 can include expert 310 configured to obtain user information from various sources on user device 202. Expert 310 can be, for example, a software module, software library, software plugin, a discrete process of operating system 204 or some other software unit. For example, expert 310 can correspond to contact expert 232, location expert 234, event expert 236, and/or any additional experts that may be configured to obtain user information, as described herein.

In some implementations, expert 310 can be configured to obtain information for various field types. For example, expert 310 can be configured to obtain information for field type 312, 314, and/or 316. Field types 312, 314, and/or 316 can be different field types. Different experts 310 can be configured to handle the same field type. For example, contact expert 232 and location expert 234 may both be configured to handle the "home address" field type. However, contact expert 232 may obtain the user's personal address information from a contacts application or database, while location expert 234 may be configured to obtain the user's personal address information from a map or navigation application. Thus, multiple experts 310 can be configured to obtain user information related to the same field type (e.g., field type 312) but the experts 310 may be configured to obtain the user information related to field type 312 from different data sources.

As described above, when expert module 230 receives a request for user information specifying a field type 302, expert module 230 can send the field type 302 to each expert 310 (e.g., contact expert 232, location expert 234, event expert 236, etc.) included in expert module 230. When expert 310 receives field type 302, expert 310 can determine whether expert 310 is configured to handle field type 302 by comparing the field type identifier (e.g., a string label identifying the field type) to the field type identifiers for the field types (e.g., field type 312, 314, and/or 316) that expert 310 is configured to handle or process. Expert 310 can determine that expert 310 is configured to handle field type 302 when expert 310 determines that the identifier for field type 302 is the same as or corresponds to one of field types 312, 314, and/or 316 that expert 310 is configured to handle. Expert 310 can determine that expert 310 is not configured to handle field type 302 when expert 310 determines that the identifier for field type 302 is not the same as or does not correspond to any of field types 312, 314, and/or 316 that expert 310 is configured to handle. When expert 310 is not configured to handle field type 302, expert 310 can return suggestion candidate data 330 with no data (e.g., a null value, empty value, empty list or collection, etc.) or data (e.g. a false Boolean value, negative value, etc.) indicating that expert 310 is not configured to handle field type 302.

When expert 310 determines that expert 310 is configured to handle field type 302, expert 310 can search various sources associated with field type 302 to obtain user information associated with field type 302. For example, expert 310 can be configured with data for each configured field type 312, 314, and 316 indicating which data sources (e.g., data sources 322, 324, 326, etc.) expert 310 should search to obtain the user information associated with each field type 312, 314, and 316. Data sources 322, 324, 326 can include hardware data sources, such as a SIM (subscriber identity module) card. Data sources 322, 324, 326 can include device and/or operating system settings sources (e.g., account settings). Data sources 322, 324, 326 can include various communication mechanisms or channels (e.g., email messages, text messages, instant messages, social media messages, etc.). Data sources 322, 324, 326 can include event sources (e.g., calendar events, restaurant reservation sources, entertainment event ticketing sources, etc.). Data sources 322, 324, 326 can include application sources (e.g., calendar application, restaurant review applications, contact application, messaging applications, social media applications, shopping applications, digital wallet application, etc.). Thus, when expert 310 determines that received field type 302 matches or corresponds to configured field type 314, expert 310 can search for, request, and/or obtain the user information associated with field type 302/314 from the data sources (e.g., data sources 322, 324, 326, etc.) associated with and/or configured for field type 302/314.

When expert 310 finds and/or obtains user information items related to field type 302 in data sources 322, 324, and/or 326, expert 310 can generate suggestion candidate data for each user information item found. In some implementations, the suggestion candidate data can include a value, a label, and/or a score. For example, the value can correspond to the user information item (e.g., a name, physical address, email address, telephone number, etc.). The label can be a string that is different than the user information item that describes the user information. For example, when presenting a suggestion, suggestion module 224 may present the label (e.g., "home", "work", or name of business, etc.) instead of, or in addition to, the actual address in the value field of the suggestion candidate data.

In some implementations, the suggestion candidate data score can be generated by expert 310. For example, expert 310 can generate the score based on the source where the user information item was found. For example, expert 310 can generate a high score for a user information item corresponding to an address when the user information item was found in a source of recently viewed (e.g., searched, browsed, etc.) addresses. For example, user device 202 can maintain a "found in apps" database of recently viewed user information items such that only user information items that have been viewed within a previous period of time (e.g., the previous 5 minutes, previous 10 minutes, etc.) are stored in the database. Expert 310 can search this database for recently viewed user information items. When expert 310 finds a user information item relevant to field type 302, expert 310 can generate suggestion candidate data that includes a high score for the user information item because the item was found in the recently viewed database. As another example, expert 310 can generate a medium level score for user information items found in an event application or database (e.g., calendar) since these user information items may cause the user to perform some activity (e.g., drive to a meeting, make a phone call, attend an event, etc.). Expert 310 can generate a low-level score for user information items found in a contacts application or database (e.g., address book) since these user information items are of general importance to the user but may not be needed by the user in the near term.

While the user information item scoring mechanism is described above using relative terms (e.g., low, medium, high), the scores generated by expert 310 can correspond to a numerical range (e.g., 0-1, 0-5, etc.). Sources can fall within the range of scores based on the relevance or importance of the user information item and/or the data sources when expert receives field type 302. For example, while expert 310 may normally generate a medium score (e.g., 0.5 in a range of 0-1) for a user information item obtained from a calendar application, expert 310 may generate a high score for a user information item obtained from the calendar application when the user information item relates to an event that will occur within a threshold period of time (e.g., within an hour, the same day, the next day) of receiving the request for user information related to field type 302. Thus, the score for a user information item from a particular source may change based on the context (e.g., date, time, recently viewed, location, etc.) associated with user device 202, field type 302, the user information request, and/or the data source.

After obtaining user information items relevant to field type 302/314 from the data sources (e.g., data sources 322, 324, 326) associated with field type 314 and generating suggestion candidate data for each of the obtained user information items, expert 310 can combine the suggestion candidate data into a single collection (e.g., list, array, etc.) and send the combined suggestion candidate data 330 to expert module 230. As described above, when expert module 230 receives suggestion candidate data 330 from each expert 310 (e.g., contact expert 232, location expert 234, event expert 236, etc.), expert module 230 can combine the suggestion candidate data 330 received from each expert into suggestion candidate data 240. Expert module 230 can send suggestion candidate data 240 to KSB process 220 and/or suggestion module 224 so that suggestion module 224 can select user information suggestions from suggestion candidate data 240 to present on suggestion bar 130 based on the scores for each suggestion candidate data item, as described above.

Example Field Types

In some implementations, the experts (e.g., experts 310) in expert module 230 can handle a variety of field types. For example, a single expert 310 can handle multiple different field types. Different experts 310 (e.g., contacts expert 232, location expert 234, event expert 236, etc.) can handle some of the same field types and some different field types. For example, contacts expert 232, location expert 234, and event expert 236 can all handle the "address" field type, while only contacts expert 232 may be configured to handle "full name," "given name," and/or "surname" fields associated with a person's (e.g., the user's) name.

Experts 310 can handle a variety of field types. For example, experts 310 can handle a "full address" field type. The "full address" field type can be used to request and/or obtain a full address (e.g., combination of street number, street name, city, state, postal code, country, etc.) associated with, or of interest to, the user. Experts 310 can handle individual address component field types, such as "street name," "city," "postal code," "state," "province," and/or "country" field types. The individual address component field types can be used to request and/or obtain specific individual address components associated with, or of interest to, the user. Experts 310 can handle a "business name"

field type. The "business name" field type can be used to request and/or obtain a business name associated with, or of interest to, the user.

In some implementations, experts 310 can handle various user name field types. For example, experts 310 can handle a "full name" field type. The "full name" field type can be used to request and/or obtain a full name (e.g., combination of given name, surname, middle name, prefix, suffix, etc.) associated with, or of interest to, the user. Experts 310 can handle individual user name component field types, such as "given name," "surname," "middle name," "prefix," and/or "suffix" field types. The individual user name field types can be used to request and/or obtain specific individual user name components associated with, or of interest to, the user.

In some implementations, experts 310 can handle various other field types. For example, experts 310 can handle an "email address" component field type. The "email address" component field type can be used to request and/or obtain email addresses associated with, or of interest to, the user. Experts 310 can handle a "phone number" component field type. The "phone number" component field type can be used to request and/or obtain telephone numbers associated with, or of interest to, the user.

Example Experts—Contacts Expert

Figure 4:
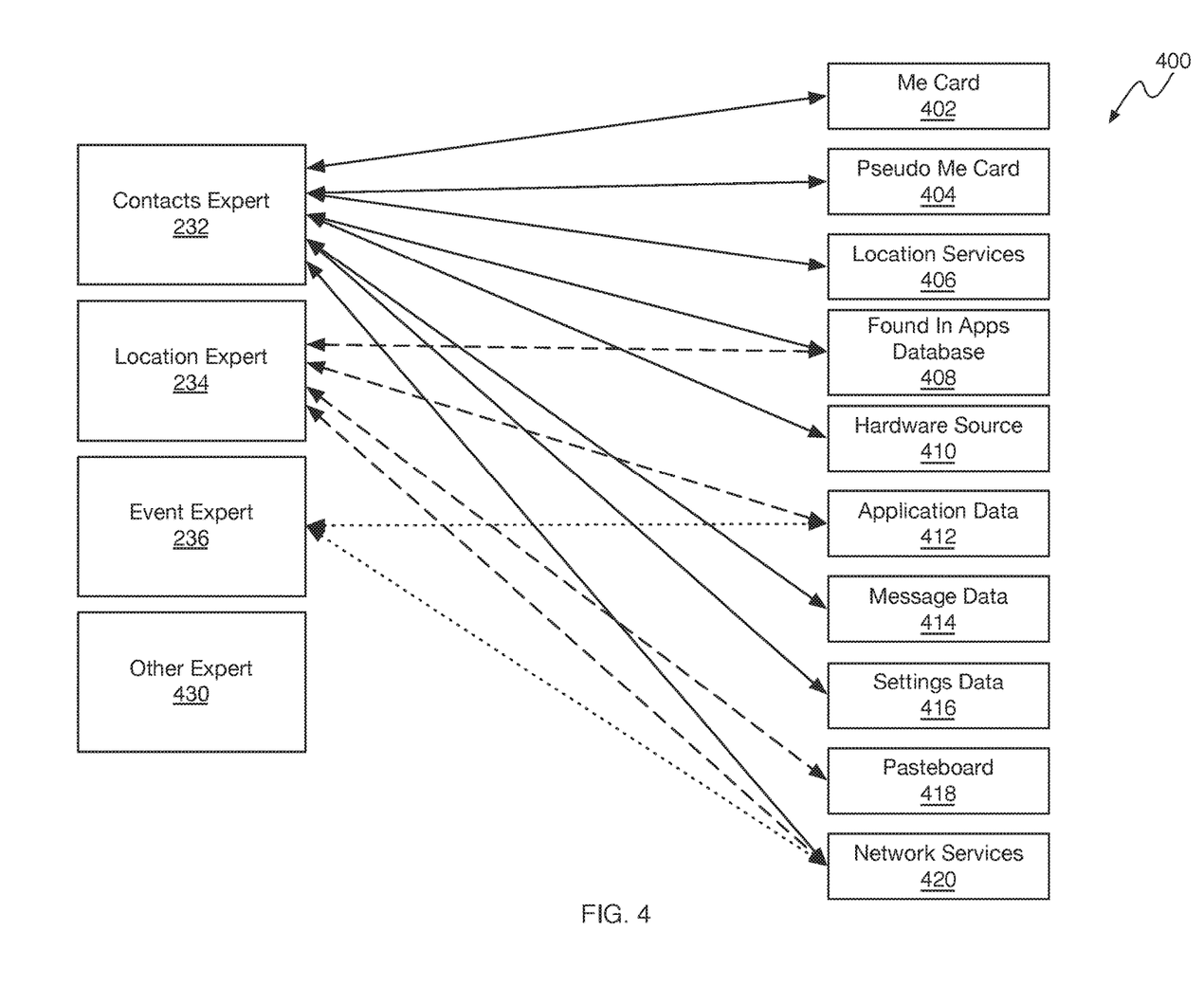
FIG. 4 is a block diagram illustrating an example expert system for obtaining user information from various data sources on a user device.

FIG. 4 is a block diagram illustrating an example expert system 400 for obtaining user information from various data sources on user device 202. System 400 can correspond, for example, to system 200 and/or system 300 described above. As described above, system 400 can include contacts expert 232, location expert 235, and/or event expert 236. These experts can be configured with common input/output APIs so that new or different experts 310 can be plugged into expert module 230 to provide new and/or different information gathering capabilities. Thus, system 400 can be configured with other expert(s) 430 as needed to provide new and/or different user information gathering capabilities. Other expert 430 can search and/or obtain user information from the same data sources as contacts expert 232, location expert 235, and/or event expert 236, or new data sources on user device 202, as needed.

In some implementations, contacts expert 232 can be configured to find and/or obtain contact information associated with the user. For example, contact information can include information identifying to various ways of contacting the user (e.g., physical address, email address, telephone number, etc.). Contacts expert 232 can handle or process various field types, such as "full address," "street name," "city," "postal code," "state," "province," "country," "full name," "given name," "surname," "prefix" (e.g., "Mr.", "Ms.", "Dr.", etc.), "suffix" (e.g., "Jr.", "Esq.", etc.) "email address," and/or "phone number."

In some implementations, contacts expert 232 can be configured to obtain contact information associated with the user from various sources. For example, contacts expert 232 can obtain contact information from the user's personal entry in a contacts application or database on user device 202. For example, the user can enter the user's contact information into a personal contact entry (e.g., "me card" 402) in a contacts book application or a contacts database stored on user device 202. Contacts expert 232 can obtain the contact information corresponding to a received field type from the user's personal contacts entry (e.g., "me card" 402).

In some implementations, contacts expert 232 can obtain contact information associated with the user from an inferred personal contact information database (e.g., "pseudo me card" 404, automatically generated "me card" information, etc.) collected by user device 202. For example, user device 202 can obtain the user's telephone number from a SIM card (hardware source 410) coupled to user device 202 and store the telephone number in the inferred contact information database (pseudo me card 404). User device 202 can obtain email addresses from email accounts configured on user device 202 (e.g., settings data 416) and store the determined locations in the inferred contact information database (pseudo me card 404). User device 202 can obtain email addresses, phone numbers, home and/or work address from information found in applications on user device 202 (e.g., application data 412). For example, the user's phone number can be obtained from an email signature. Another data source for obtaining user information can include purchase receipts received in email (e.g., message data 414). For example, user device 202 can obtain addresses and phone numbers associated with the user from purchase receipts emailed from vendors to the user when a purchase is made by the user.

As described above, user device 202 can maintain a "found in apps" database 408 that stores user information found in various software applications on user device 202. For example, phone numbers, email address, home address, work address, and/or other user information used or provided by the user in the various software applications (e.g., application data 412, settings data 416, message data 414, etc.) on user device 202 can be detected and stored in the "found in apps" database 408. Contacts expert 232 and/or other experts can obtain user information associated with the user from this "found in apps" database 408.

User device 202 can determine locations important to the user (e.g., home location, work location, etc.) based on location patterns detected by location services 406. For example, user device 202 can monitor the user's activity while the user operates user device 202 and/or applications running on user device 202. User device 202 (e.g., location services 406) can collect location information as the user is using and/or moving around with user device 202. Location services 406 can analyze the collected location information to identify patterns indicative of a home location, work location, school location, or other type of location. Location services 406 can automatically determine locations (e.g., home, work, school, etc.) important to the user and store the determined locations in the inferred contact information database (e.g., pseudo me card 404).

User device 202 can obtain the user's user information from other sources. For example, contacts expert 232 can obtain the user's billing address and phone number from various services (e.g., network services 420) configured on or accessible to user device 202. These services can include cloud storage services, cloud synchronization services, online media services, application stores, and the like. When the user configures these services for use with user device 202, user device 202 may be provided access to the user's information provided to these network services 420 by the user to configure theses services.

Location Expert

In some implementations, location expert 234 can be configured to find and/or obtain location information associated with the user. For example, location information can include information identifying to various locations that are important to the user, such as a home location, work location, location of an upcoming event, etc. Location expert 234 can handle or process various field types, such as "business name," "full address," "street name," "city," "postal code," "state," "province," and/or "country."

In some implementations, location expert 234 can obtain personal location information for the user from a variety of data sources. For example, location expert 234 can obtain location information associated with the user from locations viewed in applications on user device 202. The user can, for example, search for and/or view reviews for a restaurant in a restaurant recommendation application. User device 202 can store the address for the restaurant in "found in apps" database 408. Similarly, locations identified in websites that the user has accessed through a web browser on user device can be stored in the "found in apps" database 408 or obtained from application data 412 associated with these applications (e.g., viewing history, search history, etc.). Locations searched for and/or navigated to in a navigation application on user device 202 can stored in the "found in apps" database 408. Location expert 234 can search the "found in apps" database 408 for locations of interest or importance to the user.

Location expert 234 can obtain location information for the user from a pasteboard 418 (e.g., clipboard) on user device 202. For example, when the user performs a copy/paste or cut/paste operation on user device 202, the copied and/or cut data can be copied to the pasteboard 418 (e.g., a temporary storage location) before pasting the copied data into a document, application, or other destination. Since only recently copied data is stored in the pasteboard 418, location data found in the pasteboard 418 may be currently of interest to the user. Thus, location expert 234 can search the data stored in pasteboard 418 to determine and/or obtain location information that is currently of interest to the user.

Location expert 234 can obtain location information for the user from voice assistant recommendations. For example, user device 202 may be configured with an AI (artificial intelligence) assistant (e.g., a network service 420) that can interact with the user through voice commands and voice feedback. The AI assistant can make location recommendations (e.g., restaurants, shopping, entertainment, etc.). User device 202 can store recent recommendations from the AI assistant. Location expert 234 can search these recent recommendations to determine and/or obtain location information that is currently, or was recently, of interest to the user.

Event Expert

In some implementations, event expert 236 can be configured to find and/or obtain event information associated with the user. For example, event information can include information identifying events that the user is scheduled to attend or is otherwise involved. Event expert 232 can handle or process various field types, such as "business name," "full address," "street name," "city," "postal code," "state," "province," and/or "country."

In some implementations, event expert 236 can obtain personal event information for the user from a variety of data sources. For example, event expert 236 can obtain event information associated with the user from upcoming calendar events configured in a calendar application (e.g., application data 412) on user device 202 or configured in an online calendar service (e.g., network services 420) accessible to user device 202. For example, when a calendar event is created in the user's calendar (e.g., calendar application and/or calendar service), the user can configure the calendar event with location information for the scheduled event. Event expert 236 can search these calendar events to determine and/or obtain location information that is likely to be of interest to the user at the present time or in the near future.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 5:
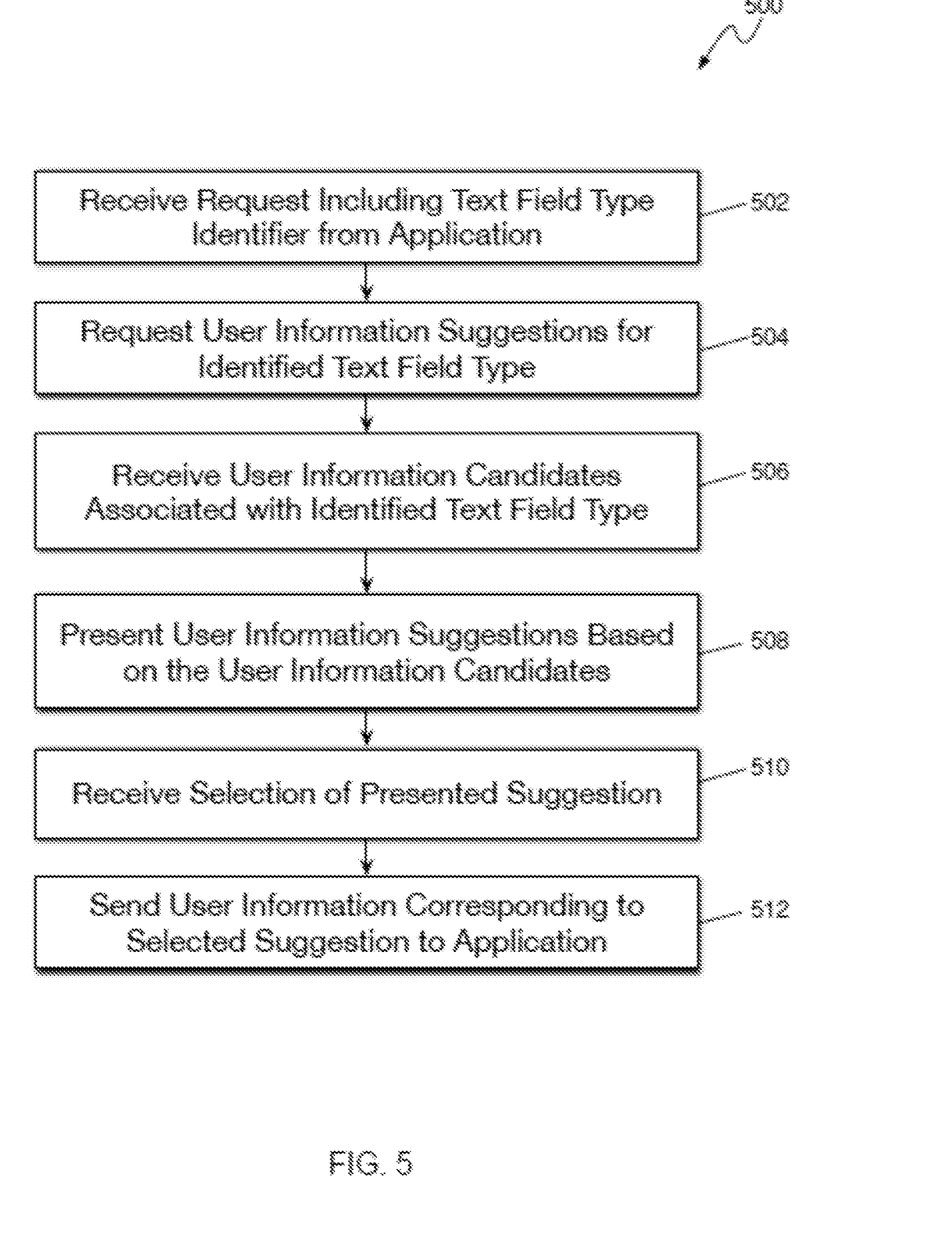
FIG. 5 is flow diagram of an example process for presenting user information suggestions.

FIG. 5 is flow diagram of an example process 500 for presenting user information suggestions. For example, process 500 can be performed by user device 202 to generate user information suggestions for a user of user device 202 to reduce the burden of typing user information into fields of a digital form. Process 500 can be performed in such a way as to avoid sharing user information with a third-party software application until the user provides explicit input indicating that the user wishes to share selected user information with the third-party software application (e.g., host application 210).

At step 502, user device 202 can receive a text field type identifier from an application. For example, KSB process 220 can receive a text field type identifier from host application 210 when the user of user device 202 selects a form field presented by host application 210. The text field type identifier can be received from host application 210 in a request to present a virtual keyboard and/or suggestion bar. As described above, KSB process 220 can be a separate process from host application 210. KSB process 220 can be provided as part of operating system 204 of user device 202.

At step 504, user device 202 can request user information suggestions for the identified text field type. For example, KSB process 220 can send a request for user information associated with the identified test field type to expert module 230. The request can include the field type identifier received at step 502. Expert module 230 can generate user information candidates associated with the identified text field type and return the user information candidates to KSB process 220. The process for generating user information candidates (e.g., suggestion candidate data) is described in detail above and further below with reference to FIG. 6.

At step 506, user device 202 can receive user information candidates associated with the identified text field type. For example, KSB process 220 can receive a collection of user information suggestion candidates from expert module 230. The suggestion candidate data received from expert module 230 can include a label describing the suggestion candidate, a value corresponding to a user information item associated with the field type identifier, and/or a score for the suggestion candidate.

At step 508, user device 202 can present user information suggestions based on the user information suggestion candidates. For example, when the collection of suggestion candidates is received at KSB process 220, suggestion module 224 can select a number (e.g., 2, 3, etc.) of highest scored suggestion candidates in the collection for presentation on suggestion bar 130. If the user has provided or is providing character input through keyboard 120 (e.g., keyboard module 222), suggestion module 224 can filter the collection of suggestion bar candidates based on the character input and then select a number of the highest scored suggestion candidates from the filtered collection. Suggestion module 224 can then present the selected suggestion candidates on suggestion bar 130. This filtering, selecting, and presenting process can be done iteratively (e.g., repeatedly) as each character input is received by KSB process 220 to refine the suggestions presented on suggestion bar 130.

At step 510, user device 202 can receive a user selection of a suggestion presented in the suggestion bar. For example, after KSB process 220 (e.g., suggestion module 224) presents the selected suggestions on suggestion bar 130, the user can select one of the suggestions presented on suggestion bar 130 to cause KSB process 220 to send the user information corresponding to the selected suggestion to host application 210. When presenting a suggestion on suggestion bar 130, suggestion module can present the label from the candidate data associated with the suggestion, the value (e.g., the user information item) from the candidate data associated with the suggestion, or both.

At step 512, user device 202 can send the selected suggestion to host application 210. For example, in response to the user selecting a suggestion presented on suggestion bar 130, KSB process 220 (e.g., suggestion module 224) can send the value from the candidate data corresponding to the selected suggestion to host application 210 as input to the user selected form field. Thus, host application 210 (e.g., a third-party application) is not provided access to the user's user information collected by user device 202 until the user explicitly provides an instruction to share an item of user information. When the user explicitly provides an instruction to share an item of user information, only the item of user information selected by the user is shared with host application 210.

Figure 6:
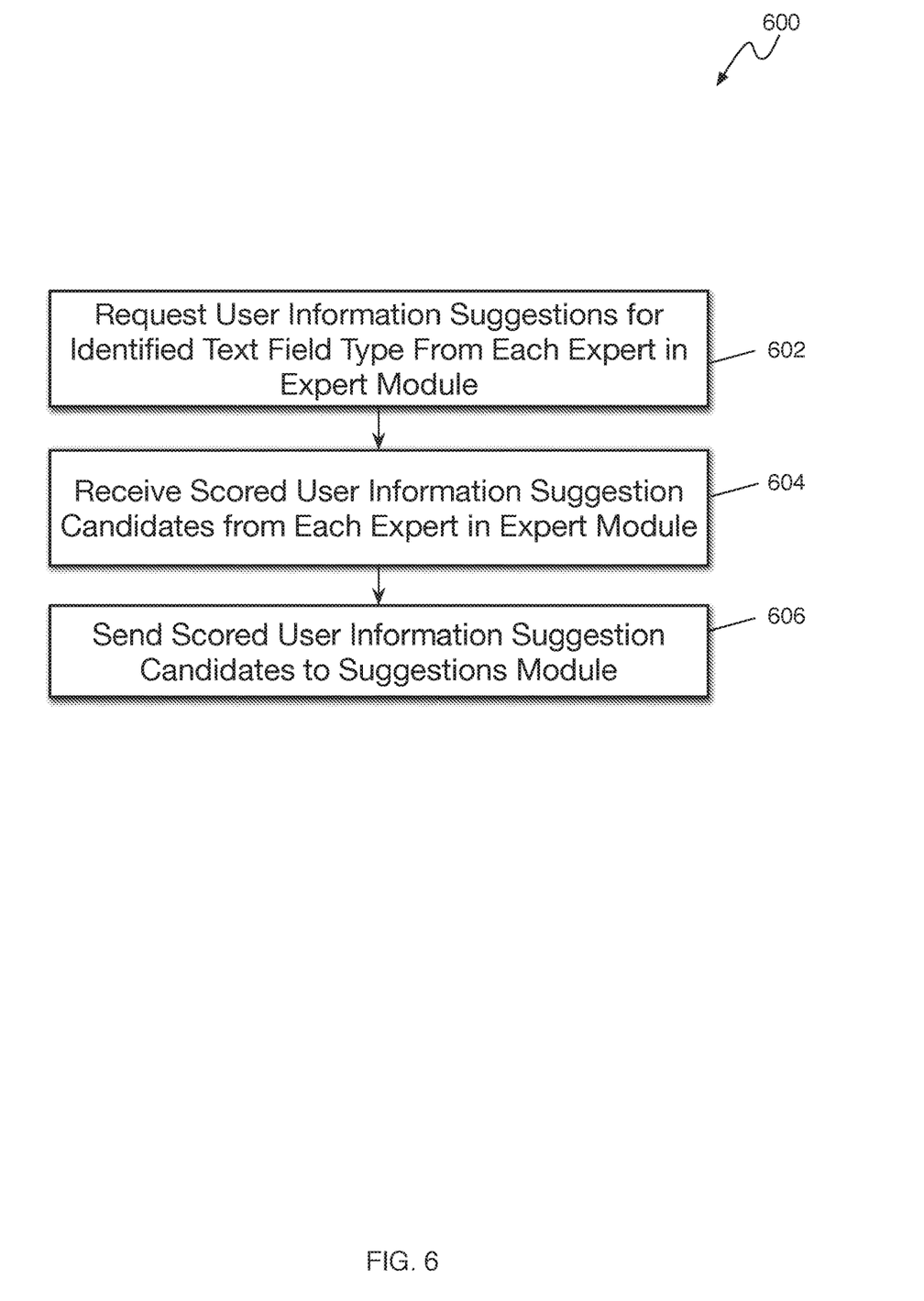
FIG. 6 is a flow diagram of an example process for obtaining user information suggestions from various sources on a user device.

FIG. 6 is a flow diagram of an example process 600 for obtaining user information suggestions from various sources on user device 202. For example, process 600 can be performed by expert module 230 on user device 202. For example, process 600 can be performed in response to expert module 230 receiving the request for user information suggestions, including a text field type identifier, at step 504 of process 500, described above.

At step 602, user device 202 can request user information suggestions for the identified text field type from each expert in expert module 230. For example, expert module 230 can be configured with multiple information gathering experts (e.g., contacts expert 232, location expert 234, event expert 236, etc.). Each expert can be configured to search for and/or obtain specific types or categories of information (e.g., contacts information, location information, event information, etc.). Expert module 230 can send the field type identifier to each expert in expert module 230 in a request for user information associated with the field type identifier.

At step 604, user device 202 can receive scored user information suggestion candidates from each expert in expert module 230. For example, each expert in expert module 230 can individually determine whether the expert is configured to handle gathering (e.g., searching for and/or obtaining) user information associated with the field type identifier. If an expert is not configured to handle the field type identifier, the expert can return an empty list of suggestion candidates and/or some value indicating that the expert is not configured to handle the field type identifier.

If an expert is configured to handle the field type identifier, the expert can search various data sources (as described above) to obtain user information associated with the field type identifier. After obtaining the user information associated with the field type identifier, each expert can generate suggestion candidate data for each item of user information obtained from the various sources. The suggestion candidate data for each user information item can include a label, a value (e.g., the user information item), and a score, as described above. After generating candidate data for each user information item, the expert can return a collection of suggestion candidates (e.g., suggestion candidate data) to expert module 230.

At step 606, user device 202 can send the scored suggestion candidates to suggestions module 224. For example, expert module 230 can combine the suggestion candidate collections received from each expert into a single collection of suggestion candidate data. Expert module 230 can send the single collection of suggestion candidate data to KSB process 220. For example, after expert module 230 sends the scored suggestion candidates (e.g., the single collection of suggestion candidate data) to KSB process 220, process 500 (described above) can continue at step 506.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to present user information suggestions. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to present user information suggestions when the user is filling out electronic forms to reduce the amount of user input required from the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, presenting user information suggestions, the present technology can be configured to allow users to select to "opt in" or "opt out" of participation in the collection of personal information data during registration for services or anytime thereafter. In another example, users can select not to provide user information data for presenting user information suggestions. In yet another example, users can select to limit the length of time user information data is maintained or entirely prohibit the development of user information databases. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, user information suggestions can be presented to users by inferring preferences based on non-personal information data or a bare minimum amount of personal information, such as the content being requested by the device associated with a user, other non-personal information available to the user information suggestion processes, or publicly available information.

Example System Architecture

Figure 7:
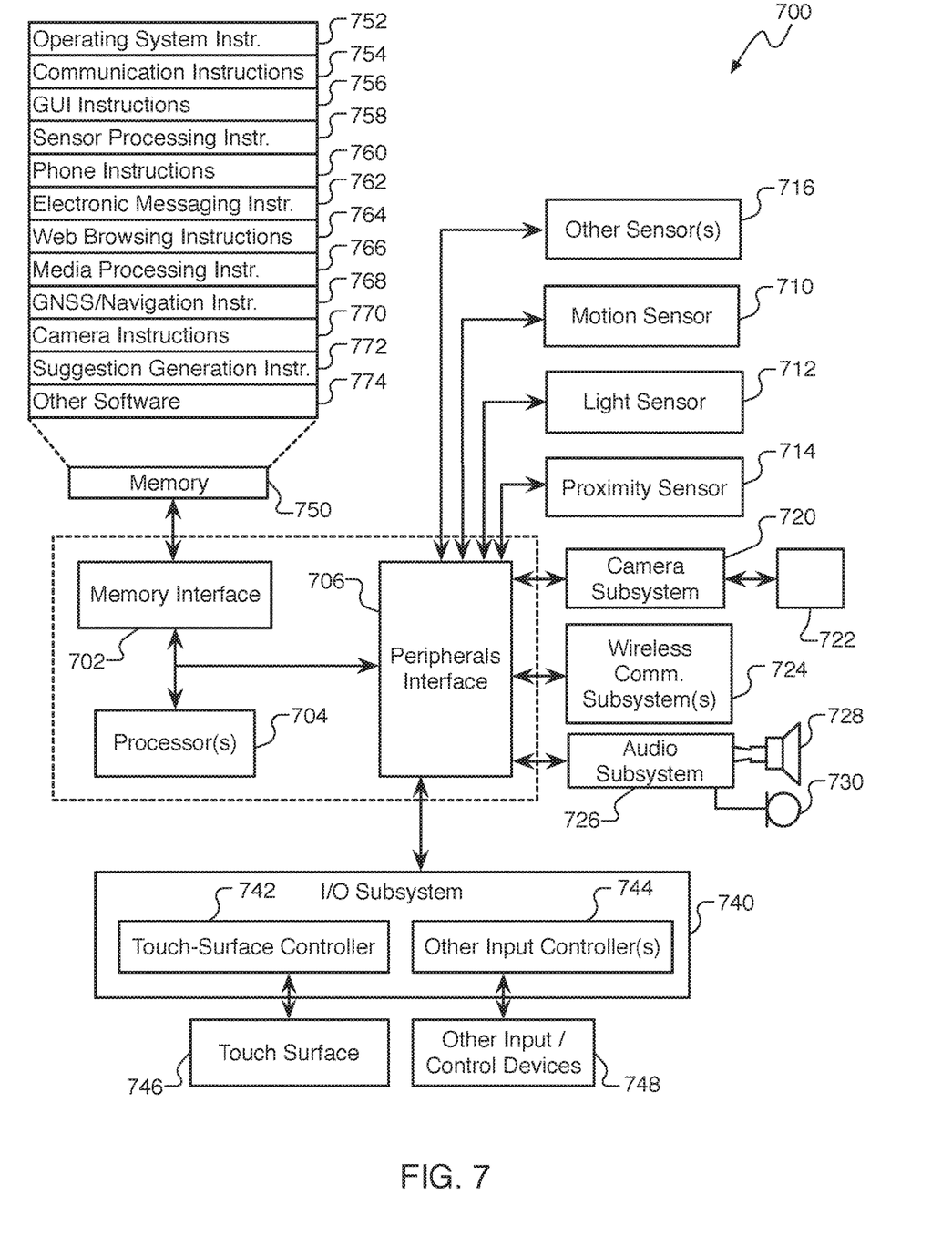
FIG. 7 is a block diagram of an example computing device that can implement the features and processes of FIGS. 1-6.

FIG. 7 is a block diagram of an example computing device 700 that can implement the features and processes of FIGS. 1-6. The computing device 700 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the computing device 700 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate orientation, lighting, and proximity functions. Other sensors 716 can also be connected to the peripherals interface 706, such as a global navigation satellite system (GNSS) (e.g., GPS receiver), a temperature sensor, a biometric sensor, magnetometer or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips. The camera subsystem 720 and the optical sensor 722 can be used to collect images of a user to be used during authentication of a user, e.g., by performing facial recognition analysis.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computing device 700 is intended to operate. For example, the computing device 700 can include communication subsystems 724 designed to operate over a GSM network, a GPRS network, an EDGE network, a Wi-Fi or WiMax network, and a Bluetooth™ network. In particular, the wireless communication subsystems 724 can include hosting protocols such that the device 100 can be configured as a base station for other wireless devices.

An audio subsystem 726 can be coupled to a speaker 728 and a microphone 730 to facilitate voice-enabled functions, such as speaker recognition, voice replication, digital recording, and telephony functions. The audio subsystem 726 can be configured to facilitate processing voice commands, voice printing and voice authentication, for example.

The I/O subsystem 740 can include a touch-surface controller 742 and/or other input controller(s) 744. The touch-surface controller 742 can be coupled to a touch surface 746. The touch surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration can disengage a lock of the touch surface 746; and a pressing of the button for a second duration that is longer than the first duration can turn power to the computing device 700 on or off. Pressing the button for a third duration can activate a voice control, or voice command, module that enables the user to speak commands into the microphone 730 to cause the device to execute the spoken command. The user can customize a functionality of one or more of the buttons. The touch surface 746 can, for example, also be used to implement virtual or soft buttons and/or a keyboard.

In some implementations, the computing device 700 can present recorded audio and/or video files, such as MP3, AAC, and MPEG files. In some implementations, the computing device 700 can include the functionality of an MP3 player, such as an iPod™.

The memory interface 702 can be coupled to memory 750. The memory 750 can include high-speed random-access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks.

The operating system 752 can include instructions for handling basic system services and for performing hardware dependent tasks. In some implementations, the operating system 752 can be a kernel (e.g., UNIX kernel). In some implementations, the operating system 752 can include instructions for performing voice authentication. For example, operating system 752 can implement the user information suggestion generation features and/or instructions 772 (e.g., KSB process 200 and/or expert module 230) as described with reference to FIGS. 1-6.

The memory 750 can also store communication instructions 754 to facilitate communicating with one or more additional devices, one or more computers and/or one or more servers. The memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions.

The memory 750 can store other software instructions 774 to facilitate other processes and functions, such as the third party host application 210 as described with reference to FIGS. 1-6. For example, software instructions 774 (e.g., third party host application 210) can be executed in a sandboxed operating environment that restricts the ability of processes defined by software instructions 774 to access the user's personal information and/or other information collected by and/or stored on computing device 700 without the user's authorization.

The memory 750 can also store other software instructions, such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

What is claimed is:

1. A method comprising:
receiving, by an operating system of a computing device and from a third-party application running on the computing device, a request for user information, the user information request including a field type identifier corresponding to a user information input field of a graphical user interface of the third-party application presented on a display of the computing device;
requesting, by the operating system from a plurality of distinct data sources, user information candidates associated with the received field type identifier, at least one of the plurality of data sources being local to the computing device;
receiving, by the operating system, a first plurality of user information candidates associated with the received field type identifier from at least one of the plurality of data sources; and
presenting, by the operating system, a plurality of user information suggestions on the graphical user interface of the third-party application, each of the plurality of user information suggestions corresponding to a respective user information candidate selected from the first plurality of user information candidates.

2. The method of claim 1, wherein the plurality of user information suggestions are not shared with the third-party software application unless the operating system receives user input explicitly indicating a desire to share the plurality of user information suggestions with the third-party software application.

3. The method of claim 1, further comprising:
receiving, by the operating system, user input selecting a particular user information suggestion presented on the graphical user interface; and
in response to receiving the selection of the particular user information suggestion, sending, by the operating system, a particular user information item corresponding to the selected user information suggestion to the third-party application.

4. The method of claim 1, further comprising:
generating a score for each of the first plurality of user information candidates, wherein the score is based on the data source from which the corresponding user information candidate was obtained; and
selecting the plurality of user information suggestions based on the respective scores generated for each of the first plurality of user information candidates.

5. The method of claim 1, wherein the operating system is configured to search the plurality of data sources for user information candidates corresponding to a plurality of different field type identifiers, including a first field type identifier and a second field type identifier, and further comprising:
searching a first collection of data sources when the received field type identifier corresponds to the first field type identifier; and
searching a second collection of data sources when the received field type identifier corresponds to the second field type identifier, wherein the second collection of data sources is different than the first collection of data sources.

6. The method of claim 1, wherein the plurality of data sources include a hardware data source that provides information about a hardware component of the computing device.

7. The method of claim 1, wherein the plurality of data sources include a communication data source, including message content.

8. The method of claim 1, wherein the plurality of data sources include a database that stores personal information items that were recently viewed in various software applications on the computing device.

9. The method of claim 1, further comprising:
requesting user information candidates from a first module of the operating system configured to obtain user information candidates associated with a first information category;
receiving a second plurality of user information candidates from the first module, wherein the first module obtained the second plurality of user information candidates from a first set of data sources;
requesting user information candidates from a second module of the operating system configured to obtain user information candidates associated with a second information category;
receiving a third plurality of user information candidates from the second module, wherein the second module obtained the third plurality of user information candidates from a second set of data sources, wherein the second set of data sources is different than the first set of data sources; and
generating the first plurality of user information candidates by combining the second plurality of user information candidates and the third plurality of user information candidates.

10. A computing device comprising:
one or more processors; and
a non-transitory computer readable medium including one or more sequences of instructions that, when executed by the one or more processors, causes the processors to perform operations comprising:
receiving, by an operating system of the computing device from a third-party application running on the computing device, a request for user information, the user information request including a field type identifier corresponding to a user information input field of a graphical user interface of the third-party application presented on a display of the computing device;
requesting, by the operating system from a plurality of distinct data sources, user information candidates associated with the received field type identifier, at least one of the plurality of data sources being local to the computing device;
receiving, by the operating system, a first plurality of user information candidates associated with the received field type identifier from at least one of the plurality of data sources; and
presenting, by the operating system, a plurality of user information suggestions on the graphical user interface of the third-party application, each of the plurality of user information suggestions corresponding to a respective user information candidate selected from the first plurality of user information candidates.

11. The computing device of claim 10, wherein the plurality of user information suggestions are not shared with the third-party software application unless the operating system receives user input explicitly indicating a desire to share the plurality of user information suggestions with the third-party software application.

12. The computing device of claim 10, wherein the instructions cause the processors to perform operations comprising:
receiving, by the operating system, user input selecting a particular user information suggestion presented on the graphical user interface; and
in response to receiving the selection of the particular user information suggestion, sending, by the operating system, a particular user information item corresponding to the selected user information suggestion to the third-party application.

13. The computing device of claim 10, wherein the instructions cause the processors to perform operations comprising:
generating a score for each of the first plurality of user information candidates, where the score is based on the data source from which the corresponding user information candidate was obtained; and
selecting the plurality of user information suggestions based on the respective scores generated for each of the first plurality of user information candidates.

14. The computing device of claim 10, wherein the operating system is configured to search the plurality of data sources for user information candidates corresponding to a plurality of different field type identifiers, including a first field type identifier and a second field type identifier, and wherein the instructions cause the processors to perform operations comprising:

searching a first collection of data sources when the received field type identifier corresponds to the first field type identifier; and     searching a second collection of data sources when the received field type identifier corresponds to the second field type identifier, where the second collection of data sources is different than the first collection of data sources.

15. The computing device of claim 10, wherein the plurality of data sources include a hardware data source that provides information about a hardware component of the computing device.

16. The computing device of claim 10, wherein the plurality of data sources include a communication data source, including message content.

17. The computing device of claim 10, wherein the plurality of data sources include a database that stores personal information items that were recently viewed in various software applications on the computing device.

18. The computing device of claim 10, wherein the instructions cause the processors to perform operations comprising:

requesting user information candidates from a first module of the operating system configured to obtain user information candidates associated with a first information category;

receiving a second plurality of user information candidates from the first module, wherein the first module obtained the second plurality of user information candidates from a first set of data sources;

requesting user information candidates from a second module of the operating system configured to obtain user information candidates associated with a second information category;

receiving a third plurality of user information candidates from the second module, wherein the second module obtained the third plurality of user information candidates from a second set of data sources, wherein the second set of data sources is different than the first set of data sources; and     generating the first plurality of user information candidates by combining the second plurality of user information candidates and the third plurality of user information candidates.

19. A non-transitory computer readable medium including one or more sequences of instructions that, when executed by one or more processors, cause the one or more processors to perform operations comprising:

receiving, by an operating system of a computing device, a request for user information from a third-party application running on the computing device, the user information request including a field type identifier corresponding to a user information input field of a graphical user interface of the third-party application presented on a display of the computing device;

requesting, by the operating system from a plurality of distinct data sources, user information candidates associated with the received field type identifier, at least one of the plurality of data sources being local to the computing device;

receiving, by the operating system, a first plurality of user information candidates associated with the received field type identifier from at least one of the plurality of data sources; and     presenting, by the operating system, a plurality of user information suggestions on the graphical user interface of the third-party application, each of the plurality of user information suggestions corresponding to a respective user information candidate selected from the first plurality of user information candidates.

20. The non-transitory computer readable medium of claim 19, wherein the instructions cause the one or more processors to perform operations comprising:

receiving, by the operating system, user input selecting a particular user information suggestion presented on the graphical user interface; and     in response to receiving the selection of the particular user information suggestion, sending, by the operating system, a particular user information item corresponding to the selected user information suggestion to the third-party application,     wherein the plurality of user information suggestions are not shared with the third-party software application unless the operating system receives user input explicitly indicating a desire to share the plurality of user information suggestions with the third-party software application.

* * * * *